United States Patent
Lin et al.

(10) Patent No.: US 8,379,366 B2
(45) Date of Patent: Feb. 19, 2013

(54) WATER-BASED ELECTROLYTE FOR ELECTRIC DOUBLE LAYER CAPACITOR AND ELECTRIC DOUBLE LAYER CAPACITOR HAVING THE SAME

(75) Inventors: Wen-Ting Lin, Tu-Chen (TW); Hung-Chang Chen, Tu-Chen (TW); Chia-Hui Lee, Tu-Chen (TW); Viktor Tokarev, Tu-Chen (TW); Ihor Chernilevskyy, Tu-Chen (TW); Hryhoriy Ilchuk, Tu-Chen (TW); Oleh Shevchuk, Tu-Chen (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 358 days.

(21) Appl. No.: 12/722,736

(22) Filed: Mar. 12, 2010

(65) Prior Publication Data
US 2011/0110020 A1    May 12, 2011

(30) Foreign Application Priority Data
Nov. 11, 2009    (TW) .............................. 98138303 A

(51) Int. Cl.
*H01G 9/00* (2006.01)
*H01G 9/02* (2006.01)
(52) U.S. Cl. ...................... 361/502; 252/62.2
(58) Field of Classification Search .............. 361/502, 361/505; 252/62.2
See application file for complete search history.

(56) References Cited

U.S. PATENT DOCUMENTS

| | | | |
|---|---|---|---|
| 3,972,734 A * | 8/1976 | King | 429/159 |
| 5,893,967 A * | 4/1999 | Knall et al. | 205/640 |
| 5,963,417 A * | 10/1999 | Anderson et al. | 361/503 |
| 6,535,373 B1 | 3/2003 | Smith et al. | |
| 7,189,475 B2 * | 3/2007 | Sasaki et al. | 429/231.1 |
| 8,116,067 B2 * | 2/2012 | Anderson et al. | 361/502 |
| 2005/0175867 A1 | 8/2005 | Adachi et al. | |

FOREIGN PATENT DOCUMENTS

| | | |
|---|---|---|
| CN | 1408121 A | 4/2003 |
| CN | 1674347 A | 9/2005 |
| DE | 19533711 | 3/1996 |
| EP | 0850932 | 6/1998 |
| WO | 2006111079 | 10/2006 |

OTHER PUBLICATIONS

English language translation of abstract of DE 19533711 (published Mar. 14, 1996).
English language translation of abstract (on p. 3) of EP 0850932 (published Jun. 1, 1998).
English language translation of abstract of WO 2006111079 (published Oct. 26, 2006).
English language translation of abstract of CN 1674347 A.
English language translation of abstract of CN 1408121 A.

* cited by examiner

*Primary Examiner* — David M Sinclair
(74) *Attorney, Agent, or Firm* — McClure, Qualey & Rodack, LLP

(57) ABSTRACT

Disclosed herein is a water-based electrolyte for an electric double layer capacitor. The water-based electrolyte includes a solution having a first salt and a second salt. The cation of the first salt may be $Li^+$, $Na^+$ or $K^+$, whereas the cation of the second salt may be $Cl^-$, $SO_4^{2-}$, $PO_4^{3-}$ or $NO_3^-$, whereas the anion of the second salt is $OH^-$.

5 Claims, 1 Drawing Sheet

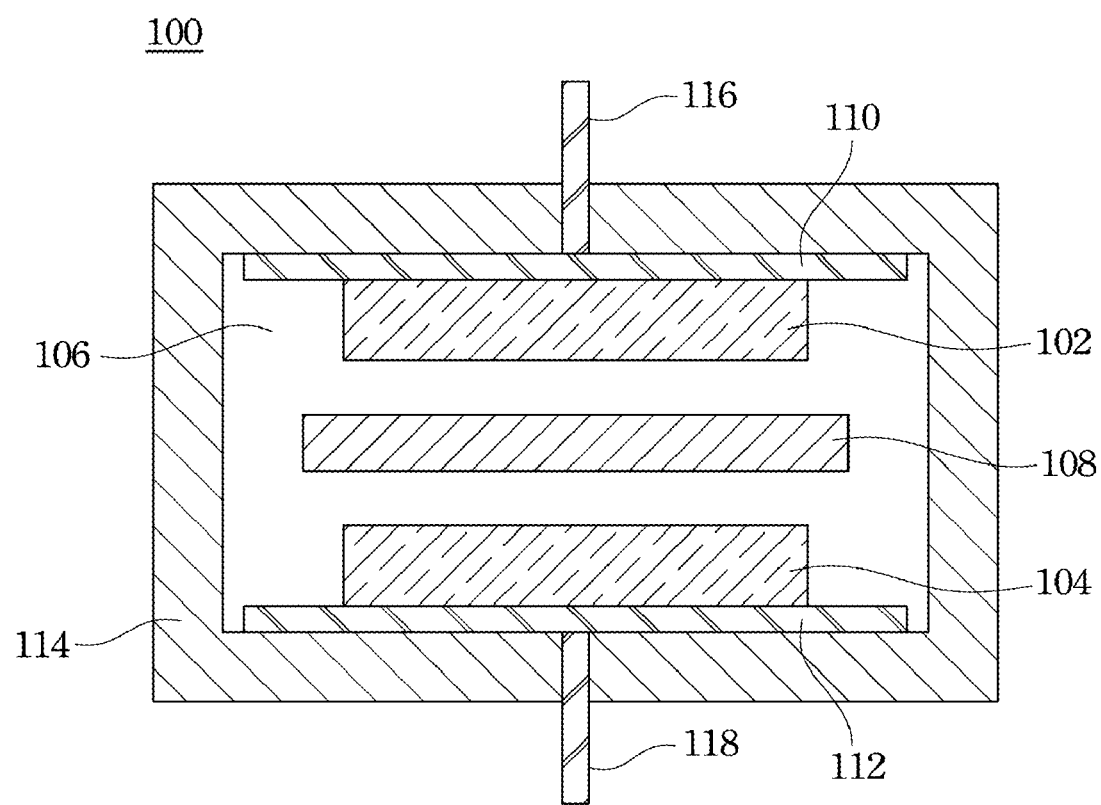

WATER-BASED ELECTROLYTE FOR ELECTRIC DOUBLE LAYER CAPACITOR AND ELECTRIC DOUBLE LAYER CAPACITOR HAVING THE SAME

RELATED APPLICATIONS

The present application claims priority to Taiwanese Application Serial Number 98138303, filed Nov. 11, 2009, the entirety of which is incorporated herein by reference.

BACKGROUND

1. Field of Invention

The present invention relates to a water-based electrolyte. More particularly, the present invention relates to a water-based electrolyte for use in an electric double layer capacitor.

2. Description of Related Art

Electric double layer capacitors are also known as supercapacitors. As its name suggests, the supercapacitor stores more energy per unit weight than the conventional capacitor. Furthermore, the electric double layer capacitor exhibits better power rating than conventional rechargeable batteries during electric output. With the advantages such as long shelf life, good cycling characteristics, and wide operating temperature range, the electric double layer capacitors have attracted attentions for their applications in energy storage and output.

Briefly, an electric double layer capacitor includes a pair of polarizable electrodes and a separator interposed therebetween, wherein the electrodes and the separator are immersed in an electrolyte. When a potential difference is applied across the electrodes, cations in the electrolyte move toward the negative electrode whereas the anions in the electrolyte move toward the positive electrode and thereby forms an ionic current within the electric double layer capacitor. When the positively charged- and negatively charged-ions arrive at their respective electrode, the charges would be adhered to the interface between the electrolyte and the respective electrode, whereas the electric field applied on the electrodes may keep the ions thereto and thereby may store the electric energy in the electric double layer capacitor.

Generally, the electrolyte of the electric double layer capacitor may be an electrolyte solution or a molten salt electrolyte. The electrolyte solutions are categorized into water-based electrolytes and organic electrolytes (also referred to as non-water-based electrolyte). Common organic electrolytes consist of tertiary or quaternary ammonium salts dissolved in an organic solvent such as propylene carbonate, acetonitrile or sulfolane. Common water-based electrolytes are aqueous solutions of metal salts, such as IA, IIA metal salts or ammonium salts, dissolved in an aqueous solvent such as KOH or $H_2SO_4$ aqueous solution.

Conventional organic electrolytes and water-based electrolytes have their own advantages and disadvantages. For example, organic electrolytes may be charged and discharged at a relatively higher voltage (about 2-3 V), and have a broader working temperature range. However, organic solvent tends to decompose at high working voltage thereby jeopardizing the charging-discharging stability. Also, the organic electrolytes have higher internal resistance, and hence, it is hard to improve the maximum discharging power of the electric double layer capacitor. The organic electrolytes are generally toxic and accordingly require a more stringent packaging condition, which would further increase manufacturing cost. Further, it is hard to control the volatility of the organic solvents and hence the service life of the organic electrolytes is usually short.

In contrast, the water-based electrolytes have the advantages of having a lower internal resistance, and hence a better discharging efficacy. In addition, the water-based electrolytes are usually non-toxic and the manufacturing cost is generally lower than that of the organic electrolytes. Yet, the working voltage of the water-based electrolyte is smaller (generally less than 1 V) due to the breakdown voltage of the solution. Further, to provide better conductivity, the water-based electrolytes are usually strong alkali (pH$\geq$13) or strong acid (pH$\leq$2). However, such solutions are highly corrosive and may seriously damage other elements of the electric double layer capacitor. The corrosiveness of the water-based electrolyte is the main cause of the narrow working temperature range of the electric double layer capacitor. In addition, the operating consistency and packaging stability are also resulted from the corrosiveness of the water-based electrolyte.

In view of the foregoing, there exists a need in the art to provide a novel electrolyte for improving the working efficacy and other operating characteristics of the electric double layer capacitor.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a water-based electrolyte for use in an electric double layer capacitor. Such water-based electrolyte exhibits a wider operating temperature range and has an energy-storage efficiency greater than 90 percents after 151 repeated charge-discharge cycles.

According to one embodiment of the present invention, the water-based electrolyte comprises a first salt and a second salt. The cation of the first salt is $Li^+$, $Na^+$ or $K^+$, whereas the anion of the first salt is $Cl^-$, $SO_4^{2-}$, $PO_4^{3-}$ or $NO_3^-$. The cation of the second salt is $Li^+$, $Na^+$ or $K^+$, whereas the anion of the second salt is $OH^-$.

According to one embodiment of the present invention, the water-based electrolyte comprises $LiNO_3$ and $LiOH$.

In another aspect, the present invention is directed to an electric double layer capacitor which exhibits a wider operating temperature ($-25°$ C. to $85°$ C.) than electric double layer capacitor using a conventional water-based electrolyte. Furthermore, the electric double layer capacitor has an energy-storage efficiency greater than 90 percents after 151 repeated charge-discharge cycles.

According to one embodiment of the present invention, the electric double layer capacitor comprises a pair of polarizable electrodes and a water-based electrolyte, wherein the pair of polarizable electrodes are impregnated with the water-based electrolyte, and the water-based electrolyte is the water-based electrolyte according to the above-mentioned aspect/embodiments of the present invention.

According to one optional embodiment of the present invention, when the first salt of the water-based electrolyte is $LiNO_3$ and the second salt is $LiOH$. In the electrolyte, the volume concentration of $LiNO_3$ is about 80-90%, and the volume percentage of $LiOH$ is about 10-20%.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIG. 1 is a schematic diagram illustrating an electric double layer capacitor according to one embodiment of the present invention.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Considering the aspects regarding the operating efficacy, working temperature, operating stability and manufacturing cost of the electrolyte, the water-based electrolyte and the organic electrolyte each have their own advantages and disadvantages. From the aspects of the product and environmental safety, water-based electrolytes are preferred materials. Therefore, one purpose of the present invention is to address the need of an improved water-based electrolyte in the related art. Moreover, to alleviate the corrosion problem, the embodiments of the present invention employ salts to carry charges.

Currently-available salt electrolytes are studied, and the properties of such materials in an aqueous solution are analyzed. For example, the capacitance, working voltage and internal resistance of the electrolyte solutions are studied. Examples of the cation of the salt in the electrolyte include metal salts of group IA and IIA and ammonium salt, whereas examples of the anion of the salt in the electrolyte include chloride ($Cl^-$), sulfate ($SO_4^{2-}$), phosphate ($PO_4^{3-}$) and nitrate ($NO_3^-$). While analyzing the operating characteristics of electrolyte solutions containing various salts, it is unexpectedly discover that the water-based electrolytes containing one of the salts and a hydroxide of group IA exhibit better operating characteristics than the water-based electrolytes containing either the salt or the hydroxide of group IA alone. The water-based electrolytes according to embodiments of the present invention and working examples illustrating the operating characteristics thereof are described hereinbelow.

In one aspect, the present invention is directed to a water-based electrolyte for use in an electric double layer capacitor. As will be evidenced from the following working examples, the water-based electrolytes according to the present invention, comparing to the conventional strong alkali or strong acid water-based electrolytes, may be operable at a wider operating temperature range and exhibit repeated rechargeability. Since the electrolyte according to the present invention contains mixed salts, the pH value of such electrolyte is lower than that of a conventional strong alkali water-based electrolyte, and therefore is less corrosive to other elements of the electric double layer capacitor.

According to one embodiment of the present invention, the water-based electrolyte comprises a first salt and a second salt. Each of the first and second salts has a cation and an anion, respectively. The cation of the first salt may be $Li^+$, $Na^+$, or $K^+$, whereas the anion of the first salt may be chloride ($Cl^-$), sulfate ($SO_4^{2-}$), phosphate ($PO_4^{3-}$) or nitrate ($NO_3^-$). The second salt is an hydroxide of group IA elements, and examples of the second salt include lithium hydroxide (LiOH), sodium hydroxide (NaOH) and potassium hydroxide (KOH).

In alternative embodiments of the present invention, each of the first salt and the second salt may have the same or different cation(s). For example, when the first salt is lithium nitrate, the second salt may be lithium hydroxide, sodium hydroxide or potassium hydroxide.

According to one optional embodiment of the present invention, the volume concentration of the first salt in the electrolyte is about 10-90%, whereas the volume concentration of the second salt in the electrolyte is about 10-90%. Preferably, the volume concentration of the first salt in the electrolyte is about 80-90%, whereas the volume concentration of the second salt in the electrolyte is about 10-20%. More specifically, the volume percentages of the first salt and second salt may be any integral or decimal numbers from 10 to 90, limits included. As will be appreciated by those with ordinary skill in the art, any numerical ranges disclosed herein include each and every numerical numbers within the respective numerical range.

According to one optional embodiment of the present invention, the cation of the first salt is $Li^+$. According to another optional embodiment of the present invention, the anion of the first salt is $NO_3^-$. According to yet another optional embodiment of the present invention, the cation of the second salt is $Li^+$.

In one preferred embodiment, a water-based electrolyte for use in an electric double layer capacitor includes $LiNO_3$ as the first salt and the LiOH as the second salt. Such water-based electrolyte is operable at a wider operating temperature range than the conventional water-based electrolytes and has an energy-storage efficiency greater than 90 percents after 151 repeated charge-discharge cycles.

In one example, the volume concentration of the $LiNO_3$ in the electrolyte is about 10-90%, whereas the volume concentration of the LiOH in the electrolyte is about 10-90%. In another example, the volume concentration of the $LiNO_3$ in the electrolyte is about 80-90%, whereas the volume concentration of the LiOH in the electrolyte is about 10-20%. More specifically, the volume concentration of the first salt and second salt may be any integral or decimal numbers from 10 to 90, limits included.

In another aspect, the present invention is directed to an electric double layer capacitor employing the water-based electrolyte according to the above-described aspect(s) and embodiment(s) of the present invention. Accordingly, such electric double layer capacitor exhibits wider operating temperature range (−25° C. to 85° C.) than electric double layer capacitors using conventional water-based electrolytes and has an energy-storage efficiency greater than 90 percents after 151 repeated charge-discharge cycles.

FIG. 1 is a schematic diagram illustrating an electric double layer capacitor according to one embodiment of the present invention. As shown in FIG. 1, the electric double layer capacitor 100 includes a pair of polarizable electrodes 102 and 104 and a water-based electrolyte 106, wherein the polarizable electrodes 102 and 104 are impregnated within the electrolyte 106. The electric double layer capacitor 100 is similar to conventional electric double layer capacitor in structure, and hence includes other elements such as a separator 108, a pair of current collectors 110 and 112, a housing 114 and conducting wires 116 and 118.

The polarizable electrodes 102 and 104 are used for storing the charges. Preferably, the main material of the electrodes 104 and 104 may be a highly conductive material such as carbon. Also, the electrodes may be porous in structure so as to provide better charge-storing capacity. For example, porous carbonaceous materials, such as carbon cloths, carbon fibers, carbon sheets or carbon powders, can be used to manufacture the polarizable electrodes 102, 104.

The water-based electrolyte 106 may contain the water-based electrolyte according to the above-described aspect(s) and embodiment(s). For example, in one example, the water-based electrolyte 106 may contain $LiNO_3$ and LiOH, wherein the volume concentration of the $LiNO_3$ in the electrolyte is about 80-90%, whereas the volume concentration of the LiOH in the electrolyte is about 10-20%.

Any well-known or conventionally materials and techniques may be used to form the housing 114 or other suitable encapsulating structure so as to seal the components of the electric double layer capacitor 100 therewithin. For example, the housing 114 may be formed from an aluminum foil.

The separator 108 is sandwiched between the pair of polarizable electrodes 102 and 104. The separator 108 is used to insulate the pair of polarizable electrodes 102 and 104 from each other so as to prevent the polarizable electrodes 102 and 104 from contacting each other and inadvertently resulting in short circuiting or rapidly depletion of the charges stored in the electrodes. Generally, the separator 108 may be porous so that the ions within the electrolyte 106 may pass therethrough. Example of the suitable materials of a separator 108 may include, but are not limited to, polytetrafluoroethene (PTFE), polypropylene (PP), fluorinated polymers, epoxy, acrylics and polyurethane.

Each of the pair of current collectors 110 and 112 is disposed on a surface of a respective polarizable electrodes 102 and 104. The current collectors 110 and 112 are used to collect the charges stored in the polarizable electrodes 102 and 104, and transfer the charges to an external circuit (not shown in FIG. 1) via the conducting wires 116 and 118 penetrating through the housing 114. Generally, the material of the current collectors 110 and 112 can be a metal sheet. The metal sheet can be formed from any conductive metal material, which may be any of aluminum, copper, titanium or nickel.

Various water-based electrolyte compositions were prepared according to the aspects and embodiments of the present invention. Electric double layer capacitors containing those water-based electrolyte compositions were also prepared and tested for the capacitor performances under operating environments of constant temperature and cyclic temperature.

In the constant temperature analysis, the Energy-storage capacities (capacitances) of the electric double layer capacitors were tested at various temperature ranges, including high-temperature (about 75° C. to about 85° C.), ambient-temperature (about 20° C. to about 25° C.) and low-temperature (about −25° C. to about −20° C.). In the cyclic temperature analysis, the capacitance of the electric double layer capacitors under a cyclic temperature were measured, wherein in the cyclic temperature condition, the temperature changes in the range between about −25° C. and about 85° C.

In the following working examples, carbon fibers (surface area: 14 cm$^2$; thickness: 2 mm; specific surface area: 1000 m$^2$/g) were used as the polarizable electrodes, an aluminum foil of PTFE was used as the encapsulating material forming the housing, and water-based electrolyte of various compositions were respectively injected into the housing so as to form an electric double layer capacitor.

During the analysis of the capacitance performance, the capacitor was disposed in an automatic temperature and humidity control device so as to determine the capacitance stored under specific operating conditions and to calculate the Energy-storage efficiency of the capacitor.

In the present disclosure, when a capacitor is charged at ambient temperature for the first time, the capacitance stored in the capacitor is referred to as the initial capacitance ($F_1$), and after multiple (say "n") cycles or a period of charging and discharging, the capacitance of the same capacitor at the n$^{th}$ cycle or the end of the period is denoted $F_n$. Also, according to the present disclosure, the term "energy-storage efficiency" can be expressed as the following equation:

$$\text{Energy-storage efficiency (\%)} = (F_n/F_1) \ast 100\%.$$

Electric double layer capacitors each employing a water-based electrolyte containing a solution of mixed lithium salts ($LiNO_3$:LiOH=1:9 v/v), mixed sodium salts ($NaNO_3$:NaOH=1:9 v/v) or mixed potassium salts ($KNO_3$:KOH=1:9 v/v) were tested for capacitance and internal resistance. Both the high-temperature (about 75° C. to about 85° C.) analysis and low-temperature (about −25° C. to about −20° C.) analysis were conducted and the results were summarized in Table 1 and Table 2, respectively.

TABLE 1

| | Constant Temperature Analysis at High Temperature | | | | | |
|---|---|---|---|---|---|---|
| Electrolyte composition | Parameter | $F_1$ | 24 hours | 96 hours | 120 hours | Efficiency (%) |
| $LiNO_3$:LiOH (1:9) | Capacitance (F) | 33.470 | 48.694 | 35.449 | 27.131 | 81.06 |
| | Internal resistance (Ω) | 0.342 | 0.752 | 1.017 | 0.994 | — |
| $NaNO_3$:NaOH (1:9) | Capacitance (F) | 38.996 | 70.339 | 62.246 | 65.286 | 167.42 |
| | Internal resistance (Ω) | 1.139 | 0.547 | 0.564 | 0.600 | — |
| $KNO_3$:KOH (1:9) | Capacitance (F) | 28.496 | — | — | — | — |
| | Internal resistance (Ω) | 1.650 | — | — | — | — |

TABLE 2

Constant Temperature Analysis at Low Temperature

| Electrolyte composition | Parameter | $F_1$ | 24 hours | 96 hours | 120 hours | Efficiency (%) |
|---|---|---|---|---|---|---|
| $LiNO_3$:LiOH (1:9) | Capacitance (F) | 33.470 | 30.422 | 30.387 | 30.630 | 91.51% |
| | Internal resistance ($\Omega$) | 0.342 | 0.592 | 0.586 | 0.585 | — |
| $NaNO_3$:NaOH (1:9) | Capacitance (F) | 38.996 | 27.075 | 28.682 | 28.503 | 73.09% |
| | Internal resistance ($\Omega$) | 1.139 | 2.969 | 3.004 | 3.030 | — |
| $KNO_3$:KOH (1:9) | Capacitance (F) | 28.496 | — | — | — | — |
| | Internal resistance ($\Omega$) | 1.650 | — | — | — | — |

During the analysis, it is found that the electrolyte containing mixed potassium salts is highly unstable at the low-temperature and high-temperature conditions, and hence, it is unable to determine the capacitance of such capacitor at those conditions.

In addition, as is clear in the data shown in Table 1 and Table 2, the electrolytes containing the mixed lithium salts and mixed sodium salts both exhibit desirable energy-storage capacities at the low-temperature and high-temperature conditions. Generally, the energy-storage efficiencies of such capacitors are greater than 70 percent in relation to the respective initial capacitance. For example, regarding the electric double layer capacitor having the electrolyte containing mixed lithium salts, the capacitance of said capacitor, after tested for 120 hours at the high-temperature condition, is about 27.131 Farad (F). Accordingly, in relation to the initial capacitance (33.470 F) of the same capacitor, the energy-storage efficiency of the capacitor under the specified conditions is about 81.06% ((27.131/33.470)*100%=81.06%).

Electric double layer capacitors each employing a water-based electrolyte containing a solution of a single lithium salt or mixed lithium salts were tested for the initial capacitance at ambient temperature. In addition, the internal resistance, the ohmic potential drop and leakage current of such capacitor under the specified condition(s) were also determined. The results were summarized in Table 3. In Table 4, the results of the capacitors tested under low temperature (about −25° C. to about −20° C.) for 24 hours were listed.

TABLE 3

Constant Temperature Analysis at Ambient Temperature

| Electrolyte composition | Capacitance (F) | Internal resistance ($\Omega$) | Ohmic potential drop (V) | Leakage current (mA) |
|---|---|---|---|---|
| LiOH | 79.812 | 0.359 | 0.952 | 7.866 |
| $LiNO_3$ | 33.125 | 0.803 | 0.936 | 4.565 |
| LiCl | 78.029 | 0.414 | 0.925 | 13.545 |
| LiOH:LiCl (1:9 v/v) | 66.772 | 1.662 | 0.754 | 9.684 |
| LiOH:$LiNO_3$ (1:9 v/v) | 44.470 | 0.815 | 0.942 | 3.276 |

TABLE 4

Constant Temperature Analysis at Low Temperature

| Electrolyte composition | Capacitance (F) | Internal resistance ($\Omega$) | Ohmic potential drop (V) | Leakage current (mA) |
|---|---|---|---|---|
| LiOH | 76.926 | 0.238 | 0.977 | 2.681 |
| $LiNO_3$ | 29.637 | 1.320 | 0.888 | 3.581 |
| LiCl | 79.970 | 0.391 | 0.948 | 12.654 |
| LiOH:LiCl (1:9 v/v) | 74.794 | 0.882 | 0.891 | 4.494 |
| LiOH:$LiNO_3$ (1:9 v/v) | 44.129 | 1.874 | 0.889 | 0.370 |

As described in the related art, LiOH, the main component conventional water-based electrolyte, has higher capacitance, yet it is hard to maintain the long-term stability of the LiOH solution. Besides, the LiOH solution is quite corrosive. Therefore, the water-based electrolyte consisting of LiOH has limited applications.

Moreover, the conductivity of the electrolyte may result in a flow of the leakage current within the capacitor which in turn allows the capacitor to discharge slowly which phenomenon is also known as dielectric leakage.

As can be seen in Table 3, the capacitor using a LiCl solution as the electrolyte has a capacitance comparable to the capacitor using a LiOH solution as the electrolyte. However, since LiCl is better in conductivity than LiOH, the capacitor containing LiCl has a greater leakage current which is less favorable to an electric double layer capacitor.

From the data shown in Table 3 and Table 4, it is clear that the electrolyte containing a solution of mixed salts according to the embodiments of the present invention may at least partially alleviate the above-identified disadvantage(s). For example, the water-based electrolyte having mixed salts of LiOH and LiCl has a leakage current (9.684 mA) lower than the water-based electrolyte having only LiCl (13.545 mA). In addition, the water-based electrolyte having mixed salts of LiOH and $LiNO_3$ also has a leakage current lower than the water-based electrolyte having only LiOH or $LiNO_3$. Another advantage of using the mixed salts solutions as the water-based electrolyte is that they are less corrosive than the strong alkali electrolytes such as NaOH, and accordingly, they have better energy-storage performance at the low temperature (See, Table 1 and Table 2) and long-term stability.

Electric double layer capacitors employing electrolytes containing LiOH:$LiNO_3$ solutions of various volume ratios were tested under ambient-temperature, low-temperature and high-temperature conditions for a time period. The capacitances and energy-storage efficiencies measured after 1 hour and 24 hours of operation are respectively summarized in Table 5 and Table 6.

TABLE 5

Energy-Storage Efficiency after 1 Hour

| Volume ratio of LiOH:LiNO$_3$ | $F_1$ Capacitance (F) | Capacitance (F) at low temperature | Efficiency (%) at low temperature | Capacitance (F) at high temperature | Efficiency (%) at high temperature |
|---|---|---|---|---|---|
| 0:10 | 30.599 | — | — | — | — |
| 1:9 | 44.470 | 43.973 | 98.88 | 67.646 | 152.12 |
| 2:8 | 64.033 | 49.329 | 77.04 | 56.432 | 88.13 |
| 3:7 | 63.159 | 42.186 | 66.79 | 61.479 | 97.34 |
| 4:6 | 64.641 | 45.767 | 70.80 | 59.389 | 91.88 |
| 5:5 | 73.525 | 54.723 | 74.42 | 57.570 | 78.30 |
| 6:4 | 74.331 | 60.380 | 81.23 | 84.609 | 113.83 |
| 7:3 | 77.171 | 55.986 | 72.55 | 61.229 | 79.34 |
| 8:2 | 78.147 | 47.646 | 60.97 | 90.215 | 115.33 |
| 9:1 | 77.772 | 50.344 | 64.73 | 92.098 | 118.42 |

TABLE 6

Energy-Storage Efficiency after 24 Hours

| Volume ratio of LiOH:LiNO$_3$ | $F_1$ Capacitance (F) | Capacitance (F) at low temperature | Efficiency (%) at low temperature | Capacitance (F) at high temperature | Efficiency (%) at high temperature |
|---|---|---|---|---|---|
| 0:10 | 30.599 | — | — | — | — |
| 1:9 | 44.470 | 44.129 | 99.23 | 60.535 | 136.13 |
| 2:8 | 64.033 | 51.367 | 80.22 | 55.178 | 86.17 |
| 3:7 | 63.159 | 41.310 | 65.41 | 59.113 | 93.59 |
| 4:6 | 64.641 | 47.042 | 72.77 | 48.232 | 74.62 |
| 5:5 | 73.525 | 54.911 | 74.68 | 64.095 | 88.38 |
| 6:4 | 74.331 | 61.123 | 82.23 | 60.706 | 81.67 |
| 7:3 | 77.171 | 55.987 | 72.55 | 59.731 | 77.40 |
| 8:2 | 78.147 | 47.166 | 60.36 | 57.860 | 74.04 |
| 9:1 | 77.772 | 50.732 | 65.23 | 64.856 | 83.39 |

As can be seen from the data shown in Table 5 and Table 6, when the volume ratio of LiOH:LiNO$_3$ is about 1:9, the capacitor using such electrolyte exhibits desirable stability at low temperature. After 24 hours of operation, such capacitor has a capacitance of 44.129 F and the energy-storage efficiency of such capacitor is about 99.23% (44.129/44.470*100%=99.23%). Meanwhile, such capacitor may also maintain a desirable efficiency at the high-temperature condition. In addition, when the volume ratio of the LiOH:LiNO$_3$ is about 2:8 and 6:4, respectively, the capacitors using such electrolytes have efficiencies greater than 80% at both high-temperature and low-temperature conditions.

Long term analysis was also conducted at ambient temperature. The electrolyte composition of the capacitor and the results are summarized in Table 7. Beside, cyclic charge-discharge analysis was also conducted, and the results are summarized in Table 8.

TABLE 7

Energy-Storage Efficiency after 105 Days

| Electrolyte composition | Parameter | Initial Charging | 30 days | 55 days | 105 days | Efficiency (%) of 105 days |
|---|---|---|---|---|---|---|
| LiOH | Capacitance (F) | 28.36 | 23.39 | 21.56 | 23.98 | 84.56% |
|  | Internal resistance (Ω) | 0.132 | 0.144 | 0.245 | 0.461 |  |
| LiOH:LiNO$_3$ (1:9 v/v) | Capacitance (F) | 19.48 | 19.14 | 18.59 | 18.81 | 96.56 |
|  | Internal resistance (Ω) | 0.142 | 0.143 | 0.048 | 0.046 |  |

TABLE 8

| Electrolyte composition | Parameter | $1^{st}$ cycle | $21^{st}$ cycle | $51^{st}$ cycle | $101^{st}$ cycle | $151^{st}$ cycle | Efficiency (%) of $151^{st}$ cycle |
|---|---|---|---|---|---|---|---|
| LiOH | Capacitance (F) | 28.36 | 24.97 | 24.20 | 25.52 | 21.56 | 76.02 |
|  | Internal resistance ($\Omega$) | 0.132 | 0.192 | 0.096 | 0.290 | 0.245 |  |
| LiOH:LiNO$_3$ (1:9 v/v) | Capacitance (F) | 19.48 | 19.69 | 19.58 | 19.14 | 18.59 | 95.43 |
|  | Internal resistance ($\Omega$) | 0.142 | 0.144 | 0.048 | 0.096 | 0.048 |  |

As is clear from the data of Table 7 and Table 8, the capacitor using the mixed lithium salts as the electrolyte according to the present invention may have an energy-storage efficiency greater than 90 percents after long term (105 days) of operation and repeated charge-discharge cycles (151 cycles).

Cyclic temperature analysis was also conducted wherein the temperature changed in the range between about –20° C. and about 80° C. In this analysis, electrolyte of the capacitor contained a solution of LiOH and LiNO$_3$ (1:9, v/v). The data listed in Table 9 are average of two repeated experiments.

TABLE 9

Cyclic Temperature Analysis

|  | Capacitance (F) | Capacitance (F) |
|---|---|---|
| $F_1$ | 33.540 | 34.970 |
| 24 hours | 34.641 | 33.230 |
| 48 hours | 32.273 | 34.150 |
| 150 hours | 32.924 | 34.742 |
| Efficiency (%) after 150 hours | 98.16 | 99.35 |

As can be seen in Table 9, under the cyclic temperature condition, the electric double layer capacitor according to the present invention has an energy-storage efficiency greater than 90 percents after 150 hours of operation.

The pH value of the electrolyte compositions used in some of the working examples and comparative examples at 25° C. are listed in Table 10. Deionized water has a pH of 6.67.

TABLE 10 pH Value of Electrolytes

| Electrolyte | pH |
|---|---|
| KOH | 14.36 |
| NaOH | 13.72 |
| LiOH | 11.96 |
| LiNO$_3$ | 7.9 |
| KOH:KNO$_3$ = 9:1 | 13.57 |
| NaOH:NaNO$_3$ = 9:1 | 13.7 |
| LiOH:LiNO$_3$ = 9:1 | 11.91 |
| LiOH:LiNO$_3$ = 5:5 | 11.78 |
| LiOH:LiNO$_3$ = 1:9 | 11.216 |

As is clear from Table 10, the water-based electrolytes according to the present invention have pH values smaller than the conventional, strong alkali electrolytes such as KOH, NaOH and LiOH. Accordingly, the water-based electrolytes according to the present invention are less corrosive than conventional ones.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A water-based electrolyte for an electric double layer capacitor, characterized in comprising a solution, which comprises LiNO$_3$ and LiOH, wherein the volume concentration of the LiNO$_3$ is about 80-90%, and the volume concentration of the LiOH is about 10-20%.

2. An electric double layer capacitor, comprising:
   a pair of polarizable electrodes; and
   a water-based electrolyte of claim 1;
   wherein the pair of polarizable electrodes are impregnated with the water-based electrolyte of claim 1.

3. The electric double layer capacitor of claim 2, further comprising a separator disposed between the pair of polarizable electrodes.

4. The electric double layer capacitor of claim 2, further comprising a pair of current collectors respectively disposed on a respective surface of respective ones of the pair of polarizable electrodes.

5. The electric double layer capacitor of claim 2, wherein the pair of polarizable electrodes comprises a carbonaceous material.

* * * * *